(12) United States Patent
Mechaley, Jr.

(10) Patent No.: US 8,577,336 B2
(45) Date of Patent: Nov. 5, 2013

(54) SYSTEM AND METHOD FOR TRANSACTION AUTHENTICATION USING A MOBILE COMMUNICATION DEVICE

(75) Inventor: Robert G. Mechaley, Jr., Kirkland, WA (US)

(73) Assignee: Mobilesphere Holdings LLC, Kirkland, WA (US)

( * ) Notice: Subject to any disclaimer, the term of this patent is extended or adjusted under 35 U.S.C. 154(b) by 286 days.

(21) Appl. No.: 12/949,144

(22) Filed: Nov. 18, 2010

(65) Prior Publication Data

US 2012/0129492 A1      May 24, 2012

(51) Int. Cl.
*H04M 1/66*      (2006.01)

(52) U.S. Cl.
USPC .......................................................... 455/411

(58) Field of Classification Search
USPC .............. 455/410–411, 418–420, 433, 432.1, 455/435.1
See application file for complete search history.

(56) References Cited

U.S. PATENT DOCUMENTS

| | | | | |
|---|---|---|---|---|
| 7,133,662 | B2 * | 11/2006 | Bravo et al. | 455/411 |
| 7,990,912 | B2 * | 8/2011 | Nix et al. | 370/328 |
| 2010/0241570 | A1 * | 9/2010 | Keresman et al. | 705/67 |
| 2011/0029416 | A1 * | 2/2011 | Greenspan | 705/30 |
| 2012/0108203 | A1 * | 5/2012 | Mechaley, Jr. | 455/411 |
| 2012/0196570 | A1 * | 8/2012 | Lindholm et al. | 455/411 |

FOREIGN PATENT DOCUMENTS

| | | |
|---|---|---|
| KR | 20000017997 A | 4/2000 |
| KR | 20040081693 A | 9/2004 |
| KR | 20100009150 A | 1/2010 |
| KR | 20100049882 A | 5/2010 |
| WO | 03027931 A1 | 4/2003 |

OTHER PUBLICATIONS

Korean Intellectual Property Office; International Search Report; Jun. 27, 2012; 189 Cheongsa-ro, Seo-gu, Daejeon Metropolitan City, 302-701, Republic of Korea.

* cited by examiner

*Primary Examiner* — Brandon Miller
(74) *Attorney, Agent, or Firm* — Michael J. Donohue; Davis Wright Tremaine LLP (57) ABSTRACT

A transaction authentication system uses a computer network and mobile telephone network to authenticate a user. The user initiates a transaction and provides an identity token, such as the mobile telephone number. The identity token is used by an authentication server to initiate the issuance of a new temporary identity for the corresponding mobile device. The new temporary identity is forwarded from the mobile device to the authentication server which issues a security code if there is a match between the new temporary identities. The security code is forwarded to a transaction server which relays it to the authentication server. If the forwarded security code matches the generated security code, the transaction is permitted to continue.

42 Claims, 4 Drawing Sheets

SYSTEM AND METHOD FOR TRANSACTION AUTHENTICATION USING A MOBILE COMMUNICATION DEVICE

BACKGROUND OF THE INVENTION

1. Field of the Invention

The present disclosure is directed generally to techniques for authentication of transactions and, more particularly, to a system and method of transaction authentication using a mobile communication device.

2. Description of the Related Art

Electronic transactions are commonplace. The use of credit cards, debit cards, and the like are routine. It is often necessary or desirable to ensure the authenticity of a requestor of such a transaction. At present, such authenticity is often provided by use of a security code that only the requesting party knows. The requesting party enters that security code to complete the transaction. Today this is commonly done with a personal identification number (PIN) code, which is usually a string of four to six digits issued to a person for use in conjunction with bank or credit card accounts.

While these codes are generally secure if properly protected, they do have two major weaknesses. The first is that individuals often create a written document with the PIN rather than memorize the PIN. The account may be compromised by obtaining the record of the PIN. Secondly, people often have difficulty remembering multiple PINs and their associated accounts.

Therefore, it can be appreciated that there is a significant need for techniques for authenticating the identity of a requestor. The present disclosure provides this, and other advantages, as will be apparent from the following detailed description and accompanying figures.

DETAILED DESCRIPTION OF THE INVENTION

The present disclosure utilizes a computer network operating in conjunction with a mobile wireless communication network to authenticate the operator of a wireless communication device and to provide a security code, such as a PIN, to the mobile communication device at the time of the transaction. As discussed in greater detail below, an initial identity code, such as the mobile telephone number, is provided when a transaction is initiated. The initial identity token is used by a transaction authentication server to contact the mobile wireless network. The transaction authentication server obtains a new temporary identity for the mobile communication device. The mobile communication device sends the new temporary identity to the transaction authentication server to confirm the authenticity of the mobile communication device. The transaction authentication server generates a security code, such as a PIN, and transmits it to the mobile communication device to use in the completion of the transaction. Various embodiments will be described below.

Figure 1:
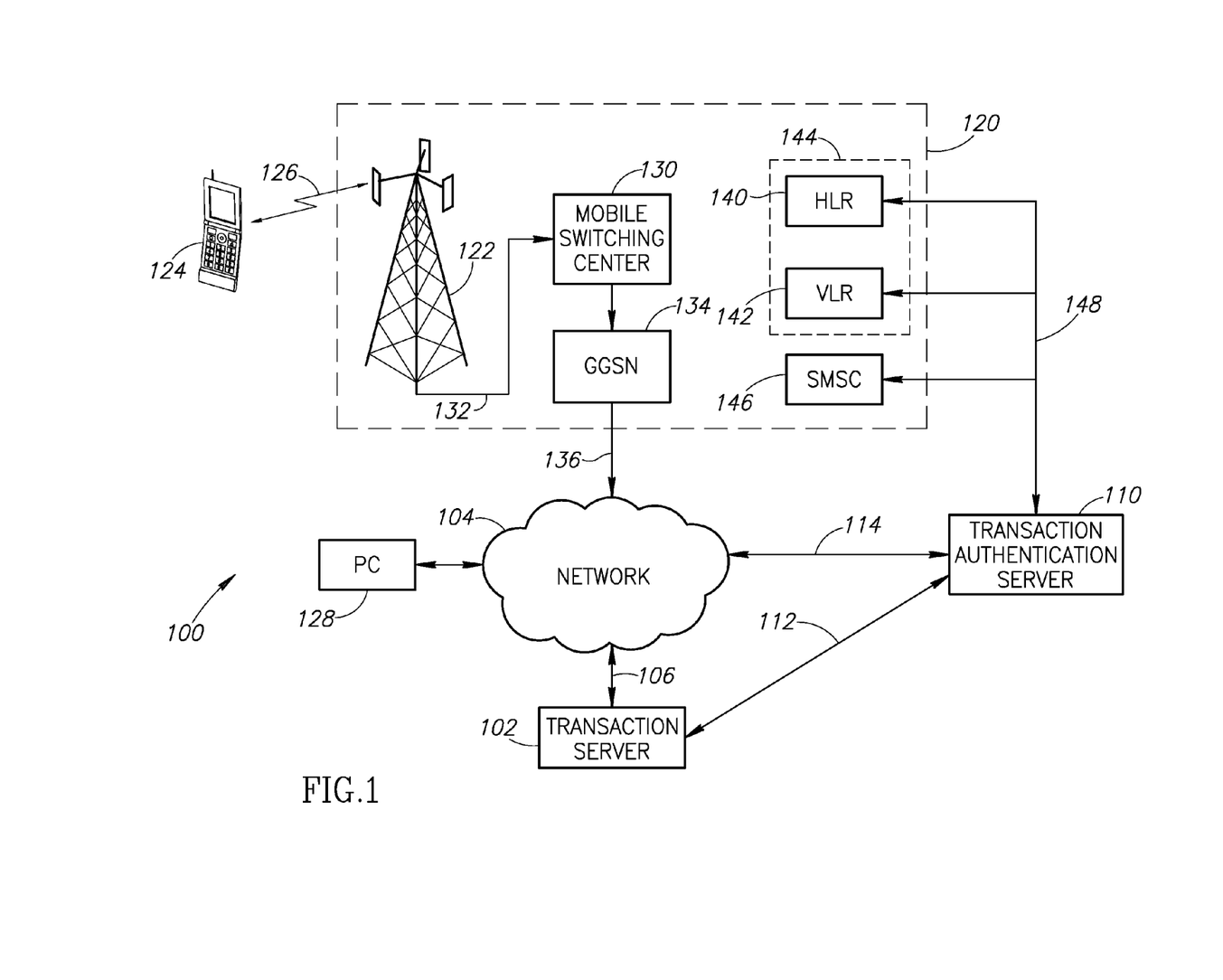
FIG. 1 is illustrates a system architecture used to implement an exemplary embodiment of the present disclosure.

The teachings described herein may be implemented using a system architecture 100 illustrated in FIG. 1. FIG. 1 illustrates a transaction server 102 coupled to a computer network 104 via a communication link 106. The transaction server 102 may be any known financial transaction processor, such as an automated teller machine (ATM), a point-of-sale (POS) terminal, or the like. For transactions with a website, the transaction server 102 may be a conventional server, such as is common for on-line transactions.

The network 104 may be a wide area network, such as the Internet, an intranet (e.g., a local area network (LAN)), or any private data network (PDN). The system 100 is not limited to any particular implementation of the network 104. The communication link 106 may be implemented using one or more of a variety of known technologies, including a wired connection, wireless, fiber optic, microwave, or the like. These different techniques may be used alone or in combination to implement the communication link 106.

A transaction authentication server 110 is communicatively coupled to the transaction server 102. In one embodiment, the transaction authentication server 110 may be co-located with the transaction server 102 and integrated therein. Alternatively, the transaction authentication server 110 may be coupled to the transaction server 102 via a communication link 112, such as may be common in a LAN or PDN. In yet another alternative embodiment, the transaction authentication server 110 may be coupled to the network 104 via a communication link 114, as may be common in a distributed system. In this embodiment, the transaction server 102 and transaction authentication server 110 communicate via the network 104 and the communication links 106 and 114. The communication links 112 and 114 may be implemented with a variety of known technologies, such as those discussed above with respect to the communication link 106. The system 100 is not limited by the specific implementation of the communication links 106, 112, and 114.

FIG. 1 also illustrates a public land mobile network (PLMN) 120. In the example embodiment of FIG. 1, the PLMN 120 is implemented in accordance with GSM standards. However, those skilled in the art will appreciate that the system 100 may be implemented with other forms of a PLMN including, but not limited to, W-GSM, 3G, 4G, CDMA, W-CDMA, OFDMA, TDMA, FDMA, LTE, and the like. Other PLMN implementations may use different names for certain system elements, but have similar functionality as the PLMN 120. The system 100 is not limited by the specific communication protocol used to implement the PLMN 120.

The PLMN 120 includes a base station 122 that communications with a mobile communication device 124 via a wireless communication link 126. FIG. 1 illustrates the mobile communication device 124 as a cellular phone or "smart phone." However, those skilled in the art will appreciate that the mobile communication device 124 may take a variety of forms including, but not limited to cell phones, PCS devices, PDA devices, wireless computers, tablet computers, mobile computing devices, and the like. The system 100 is not limited by the specific implementation of the mobile communication device 124.

Those skilled in the art will further appreciate that the PLMN 120 typically includes a large number of base stations, each of which communicates with a large number of mobile communication devices. However, for the sake of clarity, FIG. 1 only illustrates the base station 122 and the mobile communication device 124.

Communication between the base station 122 and the mobile communication device 124 occurs in a conventional manner that need not be described in greater detail herein.

Those skilled in the art will appreciate that the specific form of communication between the base station 122 and the mobile communication device 124 depends on the implementation of the PLMN 120. For example, the specific form of communication in a GSM implementation of the PLMN 120 will differ from a CDMA implementation of the PLMN 120.

The base station 122 communicates with a mobile switching center 130 via a backhaul communication link 132. The backhaul communication link 132 is a conventional communication link that need not be described in greater detail herein. Those skilled in the art will appreciate that the mobile switching center 130 typically communicates with a number of base stations in a particular geographic region.

Many current models of the mobile communication device 124 are web-enabled and are sometimes referred to as "smart phones." The PLMN 120 allows access to the network 104 using a general packet radio service. The PLMN 120 is coupled to the network 104 using a gateway GPRS support node (GGSN) 134. The GGSN 134 is coupled to the network 104 via a communication link 136.

In the GSM implementation of the PLMN 120, the mobile network includes a home location register (HLR) 140 and a visitor location register (VLR) 142. In early mobile systems, networks tended to be geographically limited. The mobile communication device 124 was initially assigned to a home location and user registration data was entered into the HLR 140. When the user operated the communication device 124 within a limited geographic home region, the HLR 140 received the identity data from the mobile communication device during registration and used that information to authenticate the mobile communication device to assure the identity of the device. For example, the data processed by the HLR 140 could determine whether the subscriber account was still active or no longer a customer, to assure that the device was not reported lost or stolen, and the like. Thus, the HLR 140 was used for identity verification and status.

When the user traveled out of the geographic home region, the initial registration process occurs with the VLR 142. The VLR 142 may communicate with the HLR 140 through communication links (not shown) in the PLMN 120 to obtain the subscriber authentication data. The VLR 142 may perform a similar authentication process to that described above with respect to the HLR 140.

Current mobile networks are far more geographically expansive and users often retain the same mobile phone even after moving from one geographic location to another. Thus, the initial limited geographic concept involving the HLR 140 and the VLR 142 has been greatly expanded. However, the basic functionality of the HLR 140 and VLR 142 to permit the identity authentication and status retrieval for the mobile communication device 102 is essentially the same as described above. For purposes of the present disclosure, the functionality of the HLR 140 and VLR 142 may be combined into a single generic location register 144.

Upon initial registration with the PLMN 120, the mobile communication device 124 transmits various pieces of data to the location register 144, such as the mobile telephone number and an international mobile subscriber identity (IMSI) associated with the mobile communication device. That information is used in the authentication process described above. In most cases, the location register 144 will assign a temporary mobile subscriber identity (TMSI) to the mobile communication device 124 upon successful completion of the initial registration process. The TMSI is subsequently used by the mobile communication device 124 instead of the mobile telephone number.

In some embodiments, the PLMN 120 may periodically trigger a process to generate a new TMSI and send it to the mobile communication device 124 such that the mobile communication device may be assigned multiple TMSI values over the course of time. In addition to the temporal generation of a new TMSI, the system 100 can generate a new TMSI based on the state of the mobile communication device 124. That is, the mobile communication device 124 may receive a new TMSI from the location register 144 when it changes to a new logical state. For example, the movement of the mobile communication device 124 to a new geographic area or base station may trigger issuance of a new TMSI from the location register 144. In some cases, the mobile communication device 124 may have multiple TMSI values simultaneously. For example, the packet data system in the mobile communication device 124 may have a packet data TMSI in addition to the usual TMSI used for voice communication.

In operation of the system 100, a user will initiate a transaction with the transaction server 102. The initiation of a transaction may occur at an ATM, for example, by inserting a debit card to allow the ATM machine to read data from a magnetic stripe. Another common form of transaction is with a POS terminal where the user hands the salesclerk the debit or credit card or swipes the card in a reader. An on-line purchase may be initiated by the mobile communication device 124 itself, or by a conventional personal computer (PC) 128 coupled to the network 104. The initiation of an online transaction using the mobile communication device 124 or the PC 128 is well known in the art and need not be described in greater detail herein.

While the current technology may require the user to remember various PINs, the system 100 allows the user to enter the mobile telephone number or other identity token associated with the mobile communication device 124. In operation, the system 100 needs to provide sufficient information to the PLMN 120 to allow the PLMN to initiate a re-registration process with the mobile communication device 124. As is known in the art, the location register 144 can uniquely identify the mobile communication device 124 using various pieces of information alone or in combination. For example, the identity token may be the mobile telephone number of the mobile communication device 124. Alternatively, or in addition to the mobile telephone number, the identity token may be the IMSI or some other equivalent mobile subscriber identity, the TMSI or other temporary mobile identifier, or the like.

In some embodiments of the PLMN 120, only the location register 144 knows the relationship between the mobile communication device 124 and the TMSI. In this embodiment, the transaction authentication server 110 will provide the necessary information, such as the mobile telephone number or IMSI, to the VLR 142. In some embodiments, the transaction authentication server receives the TMSI from the location register 144 upon initial registration of the mobile communication device 124 with the PLMN 120. The transaction authentication server 110 may store the TMSI in association with the mobile telephone number as may be done by the location register 144. If the transaction authentication server 110 receives the mobile telephone number as the identity token, it may merely pass that information along to the location register 144. If the identity token takes other forms, such as the IMSI or the TMSI, the transaction authentication server 110 can convert that information to a mobile telephone number and pass the mobile telephone number to the location register 144. In yet another alternative embodiment, the identity token may be passed along to the location register 144 in an unaltered fashion. In this embodiment, the location register 144 stores various pieces of information, such as the IMSI, TMSI, and the like in association with the mobile telephone number. This allows the location register 144 to uniquely identify the mobile communication device 124 for the re-registration process.

As will be described in greater detail below, the identity token (e.g., the mobile telephone number) is transmitted to the transaction authentication server 110. In turn, the transaction authentication server 110 transmits the identity token to the location register 144 of the PLMN 120 using a communication link 148. The PLMN 120 generates a new TMSI and transmits it to the mobile communication device 124. The new TMSI may also be provided directly to the transaction authentication server 110. When the mobile communication device 124 receives the new TMSI, it transmits it to the transaction authentication 110. If the new TMSI transmitted from the mobile communication device 124 matches the TMSI generated by the location register 144 of the PLMN 120, the transaction authentication entity verifies the authentication of the mobile communication device 124.

Following an initial authentication of the mobile communication device 124, the transaction authentication server 110 generates a security code, such as a PIN. The security code is transmitted to the mobile communication device 124. In one embodiment, the system 100 may use a short message service center (SMSC) 146, which is commonly deployed in the PLMN 120 for text messaging in current mobile devices. In the present case, the "text message" is the new security code, which may be conveniently displayed on the mobile communication device 124. The user provides the new security code to the transaction server 102. For example, the user may manually enter the new security code using a keypad commonly available at ATM machines or POS terminals. For an on-line purchase, the user may provide the new security code to the transaction server 102 using the mobile communication device 102 or the PC 128.

When the transaction server 102 receives the new security code, it transmits it directly to the transaction authentication server 110 via the communication link 112 or transmits it to the transaction authentication server via the network 104. The transaction authentication server 110 compares the security code received from the transaction server 102 with the security code previously generated by the transaction authentication server 110. If the two security codes match, the authentication process is complete and the transaction may continue. If the security codes do not match, the transaction may be terminated.

Figure 2:
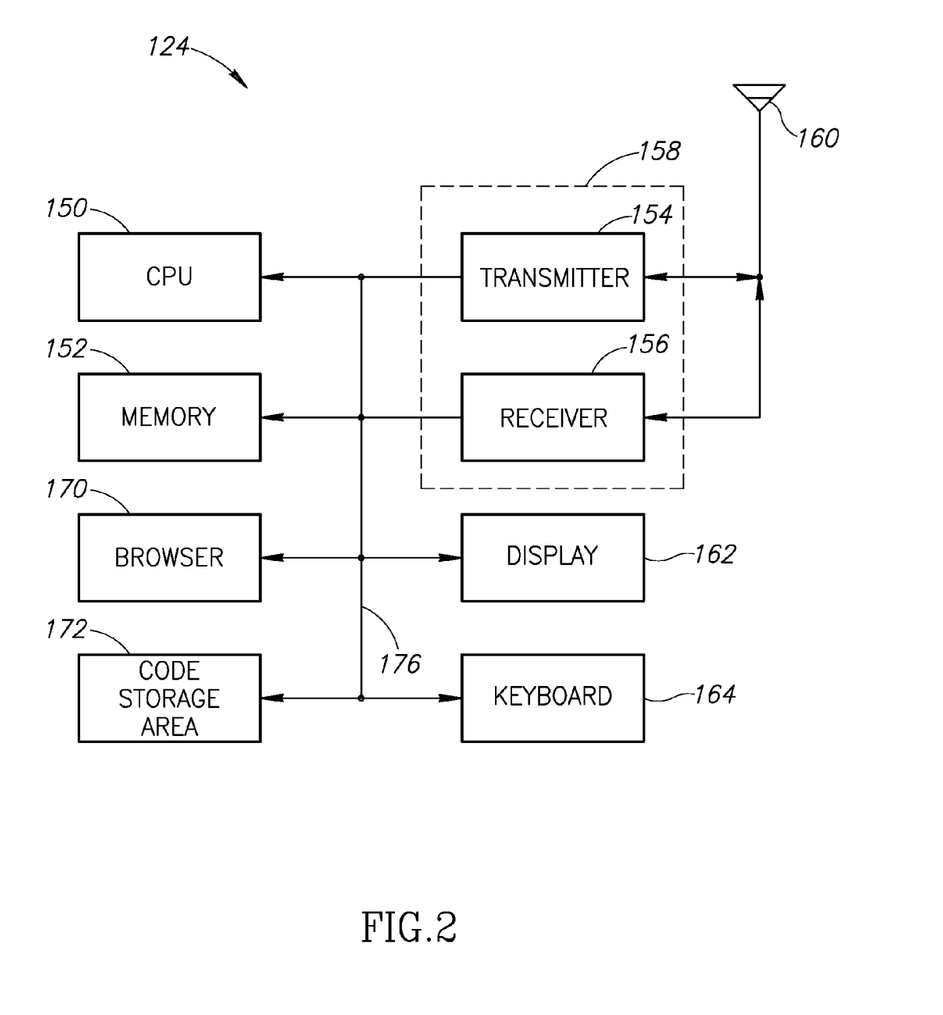
FIG. 2 is a functional block diagram of a mobile communication device operating in the system of FIG. 1.

FIG. 2 is a functional block diagram of the mobile communication device 124. The mobile communication device 124 includes a central processing unit (CPU) 150 and a memory 152. In general, the memory 152 contains data and instructions that are executed by the CPU 150. The CPU 150 may be implemented as a conventional microprocessor, microcontroller, digital signal processor (DSP), application specific integrated circuit (ASIC), or the like. The mobile communication device 124 is not limited by the specific implementation of the CPU 150. Similarly, the memory 152 may be implemented with a variety of known technologies. The memory 152 may include random access memory, read-only memory, programmable memory, and the like. In one embodiment, a portion of the memory 152 may be integrated into the CPU 150. The mobile communication device 124 is not limited by the specific form of the memory 152.

FIG. 2 also illustrates a transmitter 154 and receiver 156. In many implementations, the transmitter 154 and receiver 156 share common circuitry and are implemented as a transceiver 158. The transceiver 158 is coupled to an antenna 160. The transceiver 158 is illustrated in FIG. 2 as a generic device. Those skilled in the art will appreciate that the specific implementation of the transceiver 158 may depend on the particular PLMN 120 with which the mobile communication device 124 communicates. For example, the transceiver 158 in one mobile communication device 124 may be configured for operation in accordance with GSM standards while the transceiver 158 in a different mobile communication device may be configured for operation in accordance with CDMA or other communication protocols. However, as noted above, the system 100 may be readily implemented on mobile networks using various communication protocols and is not limited to any particular communication protocol.

In addition, the mobile communication device 124 includes a display 162 and a keyboard 164. The display 162 may be a black and white or color display and, in some embodiments, may be a touch sensitive display. In this embodiment, the functionality of the keyboard 164 may be combined with the display 162. These devices operate in a conventional manner and need no further explanation regarding operational details.

The mobile communication device 124 also includes a browser 170. Those skilled in the art will appreciate that the browser 170 is a form of an application program that is designed to access websites on the network 104. In one embodiment, the transaction with the transaction server 102 may be initiated by the mobile communication device 124 via the GGSN 134 in the PLMN 120. In this embodiment, the browser 170 is used to access a website supported by the transaction server 102. Furthermore, many financial institutions also have on-line access via the PC 128 or a mobile application executed by the mobile communication device 124 to access the transaction server 102 in a financial institution.

The mobile communication device 124 also includes a code storage area 172. As will be described in greater detail below, the code storage area 172 stores one or more forms of identity tokens and security codes that will be used to authenticate the mobile communication device 124.

The various components in FIG. 2 are coupled together by a bus system 174. The bus system 174 may include an address bus, data bus, control bus, power bus, and the like. For the sake of clarity, those various busses are illustrated in FIG. 2 as the bus system 174.

Those skilled in the art will appreciate that many of the blocks illustrated in the functional block diagram of FIG. 2 may comprise a set of software instructions stored in the memory 152 and executed by the CPU 150. For example, the browser 170 is typically implemented as a set of software instructions. Furthermore, the code storage area 172 may be a portion of the memory 152. However, these components are illustrated as separate blocks in the functional block diagram of FIG. 2 because each performs a separate function.

Figure 3:
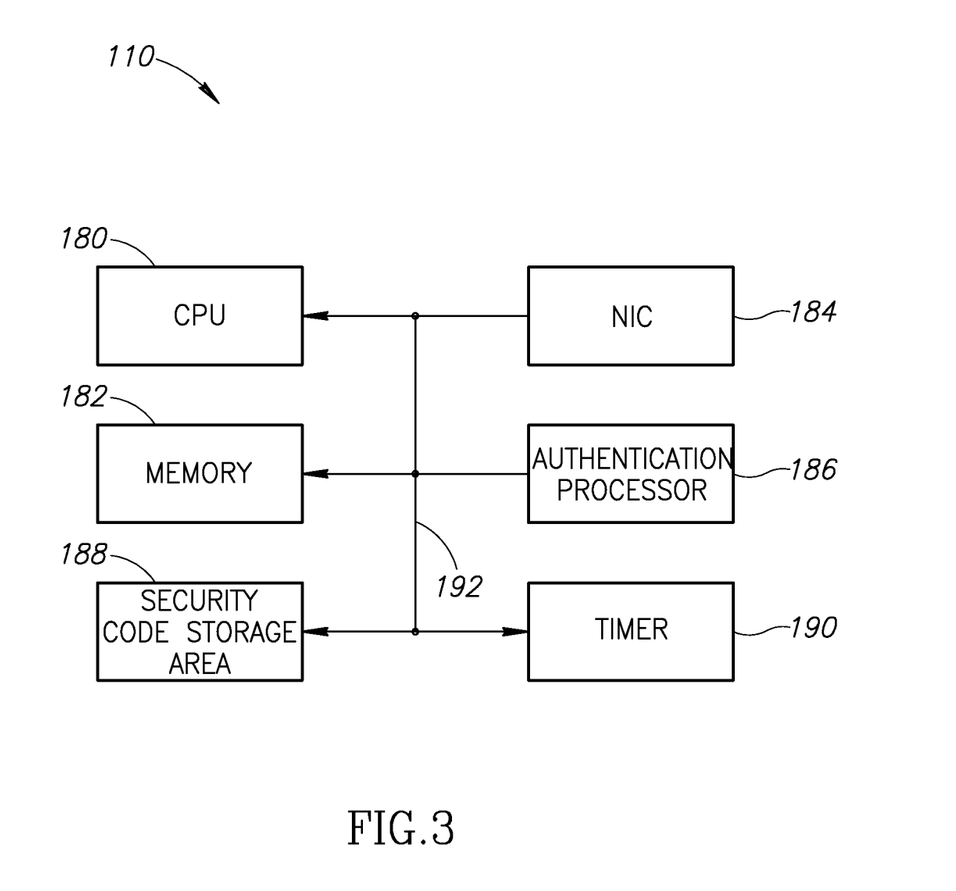
FIG. 3 is a functional block diagram of a transaction authentication server operating in the system of FIG. 1.

FIG. 3 is a functional block diagram of the transaction authentication server 110 (see FIG. 1). The transaction authentication server 110 includes a CPU 180 and the memory 182. As described above with respect to the CPU 150, the CPU 180 may be implemented by a variety of known technologies. The transaction authentication server 110 is not limited by the specific implementation of the CPU 180.

Similarly, the memory 182 may comprise a variety of known memory technologies individually or in combination. A portion of the memory 182 may be integrated into the CPU 180. The transaction authentication server 110 is not limited by the specific implementation of the memory 182.

FIG. 3 also illustrates a network interface controller (NIC) 184. The NIC 184 controls communications between the transaction authentication server 110 and the network 104 as well as communications with the transaction server 102 via the communication link 112 and communication with PLMN 120 via the communication link 148. Those skilled in the art will appreciate that the specific implementation of the NIC 184 depends on the form of the communication links 112-114 and 148. The NIC 184 may be an Ethernet interface, a fiber optic interface, wireless interface, or the like. Although FIG. 3 only illustrates a single NIC 184, the interface with the communication link 112 may be different from the interface with the communication link 114 or the interface with the communication link 148. Thus, the NIC 184 in FIG. 3 is intended to generically represent one or more network interface controllers depending on the devices to which the transaction authentication server 110 is connected.

An authentication processor 186 receives the identity token from the mobile communication device 124 (see FIG. 1) and uses it to obtain information from the location register 144 in the PLMN 120. The authentication processor 186 also requests a new TMSI from the PLMN 120 and compares it with the TMSI received from the mobile communication device 124. As previously described, the new TMSI generated by the location register 144 is provided to the transaction authentication server 110 and the mobile communication device 124. The mobile communication device 124 transmits the new TMSI back to the transaction authentication server 110 to thereby authenticate the mobile communication device.

The authentication processor 186 also generates the security code (e.g., the PIN). As described above, in one embodiment, the generated security code may be transmitted to the mobile communication device 124 using the SMSC 146.

The authentication processor 186 stores the newly generated security code in a security code storage area 188 in the transaction authentication server 110. In an exemplary embodiment, the newly generated security code is stored in the security code storage area 188 in association with the mobile communication device 124. For example, the mobile telephone number or TMSI value may be used to associate the mobile communication device 124 with the generated security code.

Finally, the authentication processor 186 receives the security code from the transaction server 102 and compares it with the generated security code stored in association with the mobile communication device 124. A match between the security code received from the transaction server 102 and the security code stored in the security code storage area 188 indicates that the mobile communication device 124 has been authenticated. The authentication processor 186 allows the transaction to continue. In contrast, if the security code received from the transaction server 102 does not match the security code in the security code storage area 188, the authentication processor 186 communicates with the transaction server 102 to terminate the transaction.

The transaction authentication server 110 also includes a timer 190. As noted above, the system 100 advantageously generates a security code during the transaction. If the user of the wireless communication device 124 is shopping at many stores, such as in a shopping mall, in a short period of time, the system 100 can keep the security code active for some period of time. The timer 190 may be used to determine a time-out period for any particular security code. That is, at the end of some pre-determined time, such as thirty minutes from the initial generation of the security code, the transaction authentication server 110 can require a new security code. In an alternative embodiment, the timer 190 can be reset following each transaction such that a time-out occurs thirty minutes after the last transaction. Those skilled in the art will appreciate that the timer may be set to different time values other than the examples presented herein. The timer 190 may be a separate component in the transaction authentication server 110 or may be integrated into the CPU 180.

In yet another alternative embodiment, the transaction authentication server 110 can be configured to require a new security code for each transaction. In this embodiment, the timer 190 can be set to a short time period, such as five minutes from the initiation of the transaction. In yet another alternative embodiment, the transaction server 102 can transmit a transaction confirmation to the transaction authentication server 110 indicating that the transaction is complete. Upon receipt of the transaction confirmation from the transaction server 102, the transaction authentication server 110 may delete or disable the security code. In this embodiment, the timer 190 may be unnecessary or may be configured to a default time-out value in the event that a transaction confirmation message is not received from the transaction server 102.

The various components in FIG. 3 are coupled together by a bus system 192. The bus system 192 may include an address bus, data bus, control bus, power bus, and the like. For the sake of clarity, those various buses are illustrated in FIG. 3 as the bus system 192.

Those skilled in the art will appreciate that the authentication processor 186 may be implemented as a set of instructions stored in the memory 182 and executed by the CPU 180. Similarly, the security code storage area 188 may be implemented as a portion of the memory 182. However, these are shown as separate elements in the functional block diagram of FIG. 3 because each performs a separate function.

Figure 4:
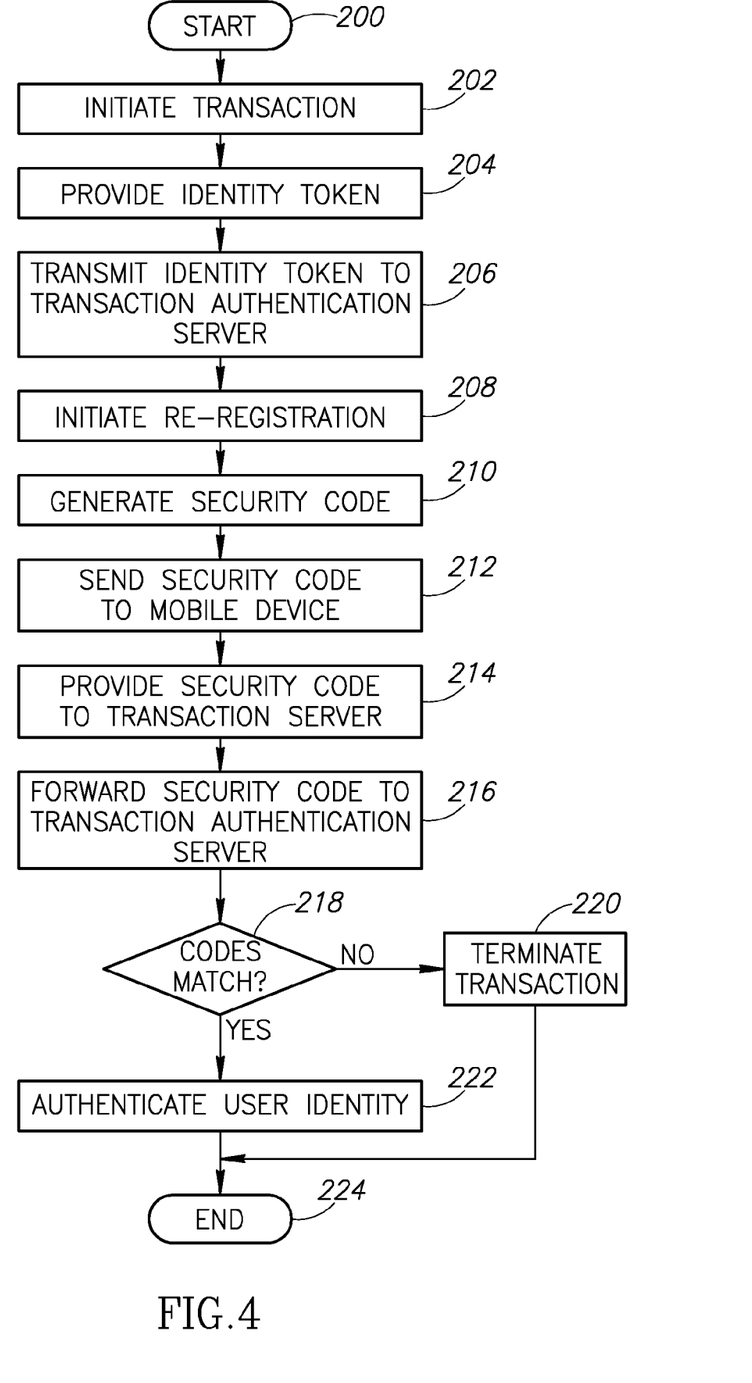
FIG. 4 is a flowchart illustrating the operation of an embodiment of the present disclosure.

The operation of the system 100 is illustrated in the flow chart of FIG. 4 where, at a start 200, the various devices are operational. In step 202, the user initiates a transaction. As discussed above, the transaction may be initiated at the physical location of the transaction server 102 (see FIG. 1), such as an ATM or POS terminal. Alternatively, the transaction may be initiated via the network 104 using the mobile communication device 124 or the PC 128. In step 204, the user provides an identity token. In an exemplary embodiment, the identity token may be the mobile telephone number of the mobile communication device 124. The identity token may be provided automatically at the initiation of the transaction. For example, the identity token may be encoded into the magnetic strip on a debit or credit card and detected when swiping the card through a reader. In another embodiment, the detection of the user's presence in a particular location, using known location detection technology, may be sufficient to derive the identity token. In yet another embodiment, knowledge of the user's mobile number through registration of the mobile communication device 124 with the PLMN 120 may be sufficient to provide the identity token. In yet another alternative embodiment, the identity token may be manually entered by the user through a log-on process using the mobile communication device 124 or the PC 128. The user may also manually enter an identity token directly into the transaction server 102, such as using the keypad at an ATM or POS terminal.

In step 206, the identity token is transmitted to the transaction authentication server 110 (see FIG. 1). If the transmitted identity token is not the mobile telephone number for the mobile communication device 124, the transaction authentication server 110 or other system component such as the PLMN 120, can match the provided identity token to the mobile telephone number. In step 208, the transaction authentication server 110 uses the mobile telephone number or TMSI to initiate a re-registration process with the location register 144 of the PLMN 120. As described above, this process will serve to create a new TMSI for the mobile communication device 124. In one embodiment, the transaction authentication server 110 provides the new TMSI value to the PLMN 120. Alternatively, the location register 144 of the PLMN 120 generates a new TMSI and reports it back to the transaction authentication server 110.

In step 210, the transaction authentication server 110 generates a security code (e.g., a PIN). In an exemplary embodiment, the security code may be based on the new TMSI or related to the new TMSI in a manner known only to the transaction authentication server 110. For example, the new TMSI may be used to generate a hash value to create the security code. Alternatively, the new TMSI value may be used as an encryption key or portion of an encryption key to generate the security code. Other mathematical forms of manipulation of the TMSI to generate the security code may also be used.

In step 212, the transaction authentication server 110 sends the security code to the mobile communication device 124. As previously noted, the security code may be provided using the SMSC 146 of the PLMN 120. Alternatively, other messaging function, such as a multimedia messaging service (MMS) messaging may be used in the PLMN 120 or using the network 104 in the GGSN 134 to provide the security code to the mobile communication device 124.

In an exemplary embodiment, the security code is shown on the display 162 of the mobile communication device 124. The security code may be shown as plain text using numerals only, alphanumeric characters, special characters (e.g. #, *, etc.), or a combination of the above. The selection of security code may depend in part on the code entry capabilities of the transaction server 102. For example, if the transaction server 102 is an ATM, it may have only a numeric keypad.

In yet another alternative embodiment, the security code may be shown on the display 162 of the mobile communication device 124 as a symbology code. For example, the security code may be displayed as a bar code or, two dimensional code, or the like. In this embodiment, the transaction server 102 includes a scanner (not shown) to read the symbology on the display 162. A scanner may be used to scan a printed symbology version of the security code or a conventional security code with alphanumeric and/or special characters. One advantage of a printed symbology is that the security code cannot be read by a nearby onlooker.

In step 214, the security code is provided to the transaction server 102. The security code may be typed in using a key pad if the transaction server is part of an ATM or POS terminal. Alternatively, the user may provide the security code to the transaction server 102 using a keyboard (not shown) on the PC 128 or the keyboard 164 of the mobile communication device 124. Alternatively, the security code may be scanned in the manner described above.

In step 216, the transaction server 102 forwards the received security code to the transaction authentication server 110. As previously discussed, the security code may be forwarded directly to the transaction authentication server 110 via the communication link 112 or transmitted to the transaction authentication server via the network 104.

In decision 218, the authentication processor 186 (see FIG. 3) determines whether the security code received from the transaction server 102 matches the stored security code in the security code storage area 188. If the security codes do not match, the result of decision 218 is NO and, in step 220, the transaction authentication server 110 instructs the transaction server 102 to terminate the transaction. Optional error messages or informational messages may be provided to the user.

If the security codes do match, the result of decision 218 is YES and, in step 222, the transaction authentication server 110 indicates to the transaction server 102 that mobile communication device 124 has been authenticated. This will allow the transaction to proceed. The process ends at step 224 following the authentication in step 222 or the termination of the transaction in step 220.

Those skilled in the art will appreciate that a number of variations are possible with the system 100. For example, the system 100 has been described with respect to a transaction. However, the principles of the system 100 can be applied for other purposes, such as a secure log-in operation on a computer network. In this embodiment, the transaction server 102 may be considered as a gateway to the secure computer network. The mobile communication device 124 or the PC 128 initiates a secure log-in process in the same manner as the initiation of a transaction. The authentication process occurs in the manner described above. However, the "transaction" in this implementation is a process to provide access to the secure computer network. Similar implementations may be used to provide access to corporate networks, websites, and the like.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an"

should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method for authentication comprising:
   initiating a transaction with a transaction server coupled to a computer network, the transaction requiring a security code for authentication;
   providing an identity token associated with a mobile communication device associated with the transaction requestor to a transaction authentication server;
   the transaction authentication server using the identity token to communicate with a public mobile telephone network associated with the mobile communication device to thereby initiate a re-registration of the mobile communication device;
   generating the security code at the transaction authentication server;
   transmitting the security code to the mobile communication device;
   providing the security code to the transaction server; and
   transmitting the security code from the transaction server to the transaction authentication server to authenticate the security code.

2. The method of claim 1 wherein the security code is authenticated if the security code received from the transaction server matches the security code generated by the transaction authentication server.

3. The method of claim 1, further comprising terminating the transaction if the security code received from the transaction server does not match the security code generated by the transaction authentication server.

4. The method of claim 1 wherein the security code is based on a temporary identity for the mobile communication device.

5. The method of claim 1 wherein the security code is transmitted to the mobile communication device as a set of human-readable characters and displayed on a display of the mobile communication device.

6. The method of claim 5, further comprising entering the set of human-readable characters using a human-operable input device to thereby provide the security code to the transaction server.

7. The method of claim 1 wherein the security code is transmitted to the mobile communication device as a symbology and displayed on a display of the mobile communication device.

8. The method of claim 7, further comprising using a scanning device to scan the symbology on the display of the mobile communication device to thereby provide the security code to the transaction server.

9. The method of claim 1, further comprising completing the transaction if the security code is authenticated and invalidating the security code a predetermined time following authentication of the security.

10. The method of claim 1, further comprising completing the transaction if the security code is authenticated and invalidating the security code upon completion of the transaction.

11. The method of claim 1 wherein initiating the transaction with the transaction server uses an automated teller machine.

12. The method of claim 1 wherein initiating the transaction with the transaction server uses a point-of-sales terminal.

13. The method of claim 1 wherein initiating the transaction with the transaction server occurs using the mobile communication device.

14. The method of claim 1 wherein initiating the transaction with the transaction server occurs using a computing device.

15. The method of claim 1 wherein the identity token is the mobile telephone number of the mobile communication device associated with the transaction requestor.

16. The method of claim 1 wherein the identity token is a subscriber identity data of the mobile communication device associated with the transaction requestor.

17. The method of claim 1 wherein the identity token is a temporary mobile subscriber identity previously assigned to the mobile communication device by the public mobile telephone network.

18. The method of claim 1 wherein the transaction authentication server is coupled to the transaction server via a wide-area network.

19. The method of claim 1 wherein the transaction authentication server is coupled to the transaction server via a local-area network.

20. The method of claim 1 wherein the transaction authentication server is a portion of the transaction server.

21. The method of claim 1, further comprising completing the transaction wherein the transaction is a financial transaction.

22. A system for transaction authentication requiring a security code using a mobile communication device coupled to a mobile network, comprising:
   a transaction server coupled to a computer network and configured to receive data to initiate a transaction;
   a transaction authentication server coupled to the computer network and configured to receive an identity token associated with a transaction request and to communicate with the mobile network using the identity token to initiate re-registration of the mobile communication device, the transaction authentication server to generate the security code and to provide the security code to the mobile communication device; and
   a data storage element associated with the transaction authentication server configured to store the security code in association with the mobile communication device;
   wherein the transaction server is further configured to receive the security code from the mobile communication device and to forward the received security code to the transaction authentication server to permit the transaction authentication server to authenticate the security code.

23. The system of claim 22 wherein the security code is authenticated if the security code received from the transaction server matches the security code generated by the transaction authentication server, the transaction server being configured to permit the transaction to proceed.

24. The system of claim 22 wherein the transaction authentication server is further configured to provide a transaction termination instruction to the transaction server if the security code received from the transaction server does not match the security code generated by the transaction authentication server.

25. The system of claim 22 wherein the transaction server and the transaction authentication server are integrated into a single computing device.

26. The system of claim 22 wherein the computer network is a Wide-Area Network.

27. The system of claim 26 wherein the transaction server and the transaction authentication server are configured for communication with each other using a Local-Area Network.

28. The system of claim 26 wherein the transaction server and the transaction authentication server are configured for communication with each other using the Wide-Area Network.

29. The system of claim 22 wherein the computer network is a Local-Area Network.

30. The system of claim 29 wherein the transaction server and the transaction authentication server are configured for communication with each other using the Local-Area Network.

31. The system of claim 29 wherein the transaction server and the transaction authentication server are configured for communication with each other using a Wide-Area Network.

32. The system of claim 22 wherein the re-registration process results in a temporary identity for the mobile communication device and the transaction authentication server is configured to generate the security code based on the temporary identity for the mobile communication device.

33. The system of claim 22 wherein the transaction authentication server is configured to generate the security code as a set of human-readable characters and displayed on a display of the mobile communication device.

34. The system of claim 33 wherein the transaction server is further configured to receive the set of human-readable characters using a human-operable input device to thereby provide the security code to the transaction server.

35. The system of claim 22 wherein the security code is transmitted to the mobile communication device as a symbology and displayed on a display of the mobile communication device.

36. The system of claim 35, further comprising a scanning device to scan the symbology on the display of the mobile communication device to thereby provide the security code to the transaction server.

37. The system of claim 22, further comprising a timer configured to measure a predetermined time following authentication of the security code wherein the transaction authentication server is further configured to invalidate the security code after expiration of the predetermined.

38. The system of claim 22 wherein the transaction authentication server is further configured to invalidate the security code upon completion of the transaction.

39. The system of claim 22 wherein the transaction server is configured to initiate the transaction in response to data received from an automated teller machine.

40. The system of claim 22 wherein the transaction server is configured to initiate the transaction in response to data received from a point-of-sales terminal.

41. The system of claim 22 wherein the transaction server is configured to initiate the transaction in response to data received from using the mobile communication device.

42. The system of claim 22 wherein the transaction server is configured to initiate the transaction in response to data received from a computing device.

* * * * *